(12) United States Patent
Ueno et al.

(10) Patent No.: US 6,792,749 B2
(45) Date of Patent: Sep. 21, 2004

(54) EXHAUST GAS PURIFYING APPARATUS FOR INTERNAL COMBUSTION ENGINE

(75) Inventors: Masaki Ueno, Saitama-ken (JP); Shiro Takakura, Saitama-ken (JP); Yasuyuki Miyahara, Saitama-ken (JP); Tadashi Sato, Saitama-ken (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/449,393

(22) Filed: Jun. 2, 2003

(65) Prior Publication Data

US 2004/0000137 A1 Jan. 1, 2004

(51) Int. Cl.[7] ............................................... F01N 3/00
(52) U.S. Cl. ............................ 60/284; 60/277; 60/287; 60/295; 60/297
(58) Field of Search ...................... 60/274, 277, 284, 60/287, 292, 295, 297, 324

(56) References Cited

U.S. PATENT DOCUMENTS

| | | | |
|---|---|---|---|
| 6,009,742 A | * | 1/2000 | Balko ........................ 73/23.31 |
| 6,389,804 B1 | * | 5/2002 | Yasui et al. ................... 60/277 |
| 6,519,930 B1 | * | 2/2003 | Maus et al. ................... 60/274 |
| 6,588,204 B2 | * | 7/2003 | Hirota et al. .................. 60/297 |

FOREIGN PATENT DOCUMENTS

JP    2004060563 A  *  2/2004  .................. 60/285

* cited by examiner

Primary Examiner—Binh Q. Tran
(74) Attorney, Agent, or Firm—Arent Fox, PLLC.

(57) ABSTRACT

An exhaust gas purifying apparatus for an internal combustion engine is provided for switching a switching valve at an optimal timing in accordance with an actual activated state of a catalyzer to achieve an optimal exhaust gas characteristic. The exhaust gas purifying apparatus comprises a catalyzer disposed in an exhaust system of the internal combustion engine, an adsorbent filled in a second passage circumventing a first passage in the exhaust system for adsorbing hydrocarbons within exhaust gases, a switching valve operable to switch between an open position for opening the first passage and a close position for closing the first passage, an ECU for detecting a temperature state of the exhaust system upon start of the internal combustion engine, and calculating the calory of exhaust gases discharged after the start of the internal combustion engine, and a switching valve driver for driving the switching valve to the close position upon start of the internal combustion engine, and driving the switching valve to the open position in accordance with the detected start-time temperature state of the exhaust system, and the calculated post-start exhaust gas calory.

3 Claims, 8 Drawing Sheets

EXHAUST GAS PURIFYING APPARATUS FOR INTERNAL COMBUSTION ENGINE

BACKGROUND OF THE INVENTION

1. Field of the Invention

The present invention relates to an exhaust gas purifying apparatus which purifies exhaust gases exhausted from an internal combustion engine, and temporarily adsorbs hydrocarbons within exhaust gases upon start of the internal combustion engine.

2. Description of the Prior Art

The type of conventional exhaust gas purifying apparatus for an internal combustion engine mentioned above is known, for example, from Laid-open Japanese Patent Application No. 2000-310113. The exhaust gas purifying apparatus disclosed therein comprises a pair of upstream and downstream three-way catalysts in an exhaust pipe of an internal combustion engine. An inner main exhaust passage and an annular bypass passage around the main exhaust passage are formed between the two three-way catalysts within the exhaust pipe. The bypass passage has a passage area smaller than the main exhaust passage, and is filled with a hydrocarbon adsorbent. A switching valve is also provided at the inlet port of the main exhaust passage for opening and closing the main exhaust passage.

For controlling the switching valve, it is determined whether or not the following three conditions are met after the engine is started:

1) whether or not a cooling water temperature of the engine detected by a water temperature sensor is lower than a predetermined temperature;
2) whether or not the amount of intake air detected by an air flow meter is smaller than a predetermined amount; and
3) whether or not a time elapsed after the start is shorter than a catalyst activation time which is determined in accordance with the cooling water temperature.

When the three conditions are all met, the switching valve is fully closed on the assumption that the downstream three-way catalyst has not been activated. In this state, exhaust gases passing through the upstream three-way catalyst are entirely passed to the bypass passage, so that hydrocarbons within the exhaust gases are adsorbed by the adsorbent filled in the bypass passage. Then, the exhaust gases flow into the downstream three-way catalyst, thereby preventing hydrocarbons from being emitted to the atmosphere. On the other hand, when any of the three conditions is not met, the switching valve is fully opened on the assumption that the downstream three-way catalyst has been activated. In this state, a majority of exhaust gases pass through the main exhaust passage, which has a larger passage area, and subsequently flows into the downstream three-way catalyst for purification through its oxidation/reduction actions.

However, the conventional exhaust gas purifying apparatus determines whether the downstream three-way catalyst is activated after the start of the engine based on the cooling water temperature, amount of absorbed air, and time elapsed after the start, which are used as parameters, so that the exhaust gas purifying apparatus may fail to make appropriate determination, resulting in the inability to switch the switching valve at an appropriate timing. For example, since the downstream three-way catalyst is located substantially away from the engine body for which the cooling water temperature is detected, the temperature of the downstream three-way catalyst rises with a delay from the cooling water temperature. As such, the cooling water temperature does not always match the temperature of the downstream three-way catalyst in rising timing, behavior and the like. Therefore, the cooling water temperature may not exactly reflect the actual temperature state of the downstream three-way catalyst, i.e., whether it is activated.

To solve the disadvantage as mentioned above, the temperature of the downstream three-way catalyst may be directly detected by a temperature sensor for use as a parameter instead of the cooling water temperature. With this strategy, however, the activation of the three-way catalyst cannot either detected with high accuracy because the temperature sensor generally has a responsibility too low for use with the downstream three-way catalyst which is activated in a relatively short time after the start of the engine, and also because the temperature sensor experiences difficulties in detecting the temperature at the center of the downstream three-way catalyst, which is critical for evaluating whether or not the three-way catalyst is activated, in a temperature distribution of the three-way catalyst which can readily vary when the temperature rises in such a short time.

Also, since the temperature rising rate of the downstream three-way catalyst depends on a particular operating condition after the start of the engine (for example, when the vehicle is idled after the start, and when the vehicle is launched immediately after the start), the time elapsed after the start does not either reflect exactly an actual activated state of the downstream three-way catalyst. Further, in regard to the amount of intake air, since a detection value detected every predetermined time is compared with a predetermined value, the conventional exhaust gas purifying apparatus will erroneously determine that the downstream three-way catalyst has been activated if the amount of intake air instantaneously increases. From the result of the foregoing analysis, the conventional exhaust gas purifying apparatus cannot set a timing at which the switching valve is switched to the main exhaust passage appropriately in response to a transition of the downstream three-way catalyst into activation. Consequently, if the switching valve is switched at a timing too early, exhaust gases will flow into the inactivated downstream three-way catalyst, so that hydrocarbons will be emitted to the atmosphere to exacerbate the exhaust gas characteristic. On the other hand, if the switching valve is switched at a timing too late, exhaust gases will flow into the downstream three-way catalyst with a delay, though it has been already activated, thereby failing to effectively utilize the purifying performance.

OBJECT AND SUMMARY OF THE INVENTION

The present invention has been made to solve the problems as mentioned above, and it is an object of the invention to provide an exhaust gas purifying apparatus for an internal combustion engine which is capable of switching a switching valve at an optimal timing in accordance with an actually activated state of a catalyzer to achieve an optimal exhaust gas characteristic.

To achieve the above object, the present invention provides an exhaust gas purifying apparatus for an internal combustion engine for purifying exhaust gases of the internal combustion engine, and temporarily adsorbing hydrocarbons within exhaust gases upon start of the internal combustion engine. The exhaust gas purifying apparatus is characterized by comprising a catalyzer disposed in an exhaust system of the internal combustion engine for purifying exhaust gases; an adsorbent filled in a second passage circumventing a first passage in the exhaust system for adsorbing hydrocarbons within exhaust gases; a switching valve operable to switch between an open position for opening the first passage and a close position for closing the first passage; start-time temperature state detecting means for detecting a temperature state of the exhaust system upon start of the internal combustion engine; post-start exhaust gas calory calculating means for calculating the calory of exhaust gases discharged after the start of the internal combustion engine; and switching valve driving means for driving the switching valve to the close position upon start of the internal combustion engine, and driving the switching valve to the open position in accordance with the detected start-time temperature state of the exhaust system, and the calculated post-start exhaust gas calory.

According to this exhaust gas purifying apparatus for an internal combustion engine, the switching valve is driven to the close position to close the first passage upon start of the internal combustion engine, thereby forcing exhaust gases to flow into the second passage which circumvents the first passage. In this way, hydrocarbons within the exhaust gases are adsorbed by the adsorbent filled in the second passage, preventing the emission of the hydrocarbons to the atmosphere.

Subsequently, the switching valve is driven to the open position to open the first passage in accordance with a start-time temperature state of the exhaust system, and post-start exhaust gas calory. In this way, exhaust gases are guided to flow into the first passage, and the adsorbent finishes adsorbing hydrocarbons. The exhaust gases are purified by the activated catalyzer before they are emitted to the atmosphere. The start-time temperature state is a parameter indicative of a temperature state of the exhaust system and the catalyzer provided therein upon start of the internal combustion engine, while the post-start exhaust gas calory is a parameter indicative of the calory applied to the exhaust system including the catalyzer from exhaust gases after the start. Therefore, a combination of these two parameters exactly reflect the temperature state, i.e., activated state of the catalyzer after the start. Also, the activated state of the catalyzer is evaluated based on the parameter indicative of the temperature state only upon starting in the foregoing manner, and is evaluated based on the exhaust gas calory used as a parameter after the start based on the temperature state. It is therefore possible to highly accurately determine the activated state of the catalyzer while avoiding the inaccuracy which would be resulted when the activated state is determined using the result of detection by a temperature sensor after the start. Consequently, the switching valve can be driven to the open position at an optimal timing immediately after the catalyzer is actually activated, thereby achieving an optimal exhaust gas characteristic.

Preferably, in the exhaust gas purifying apparatus for an internal combustion engine, the start-time temperature state detecting means includes stop-time temperature detecting means for detecting the temperature of the exhaust system at the preceding stop of the internal combustion engine; and inoperative time measuring means for measuring an inoperative time from the preceding stop to the current start of the internal combustion engine, wherein the start-time temperature state detecting means is configured to find the start-time temperature state of the exhaust system in accordance with the detected stop-time temperature of the exhaust system and the measured inoperative time.

The temperature in the exhaust system upon stop of the internal combustion engine depends on an operating condition including an operating time of the internal combustion engine until the stop, and the temperature in the exhaust system after the stop varies from this stop-time temperature in accordance with a time elapsed from the stop. Thus, according to this preferred embodiment of the exhaust gas purifying apparatus, the start-time temperature state in the exhaust system can be highly accurately detected in accordance with the preceding operating condition of the internal combustion engine, and the duration in which the engine has been inoperative. Thus, the activated state of the catalyzer can be determined with higher accuracy in accordance with the start-time temperature state of the exhaust system, so that the switching valve can be more appropriately switched in accordance with the activated state of the catalyzer.

Preferably, in the exhaust gas purifying apparatus for an internal combustion engine, the start-time temperature state detecting means further includes an ambient temperature detecting means for detecting the ambient temperature around the internal combustion engine, wherein the start-time temperature state detecting means is configured to find the start-time temperature state of the exhaust system in accordance further with the detected ambient temperature.

The temperature in the exhaust system after the internal combustion engine is stopped varies depending not only on the length of elapsed time after the stop but also on the ambient temperature around the internal combustion engine, and varies at a larger rate, for example, when there is a larger difference between the temperature in the exhaust system upon stop of the internal combustion engine and the ambient temperature. Thus, according to this preferred embodiment of the exhaust gas purifying apparatus, the ambient temperature around the internal combustion engine is employed as an additional parameter to more accurately detect the start-time temperature state of the exhaust system, thereby making it possible to more appropriately determine whether the catalyst is activated and switch the switching valve.

DETAILED DESCRIPTION OF THE EMBODIMENTS

Figure 1:
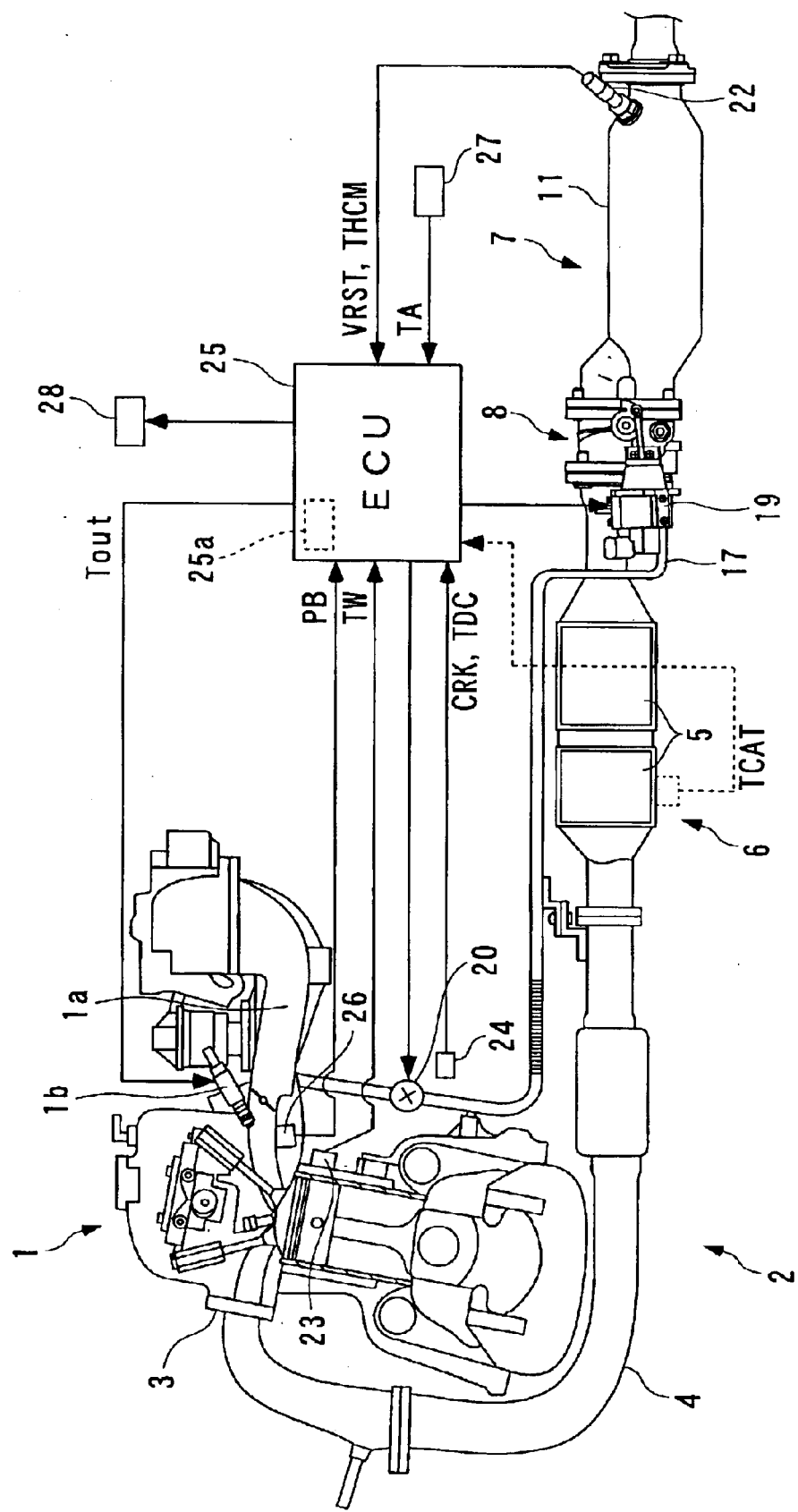
FIG. 1 is a diagram generally illustrating the configuration of an internal combustion engine in which an exhaust gas purifying apparatus is applied according to a first embodiment of the present invention.

In the following, a preferred embodiment of the present invention will be described in detail with reference to the accompanying drawings. FIG. 1 illustrates an internal combustion engine (hereinafter called the "engine") in which an exhaust gas purifying apparatus is applied according to a first embodiment of the present invention. The engine 1 is, for example, a four-cylinder four-cycle engine equipped in a vehicle, not shown. The engine 1 comprises an exhaust system 2 which has an exhaust pipe 4 connected to the engine 1 through an exhaust manifold 3. A catalyzer 6 having two three-way catalysts 5, and a hydrocarbon adsorber 7 for adsorbing hydrocarbons are provided halfway in the exhaust pipe 4. The two three-way catalysts 5 of the catalyzer 6 are arranged adjacent to each other along the exhaust pipe 4, and purify harmful substances (hydrocarbons (HC), carbon monoxide (CO) and nitrogen oxides (NOx)) within exhaust gases passing through the catalyzer 6 by oxidation-reduction catalyst actions, when they are heated to a predetermined temperature (for example, 300° C.) or higher and activated.

Figure 2:
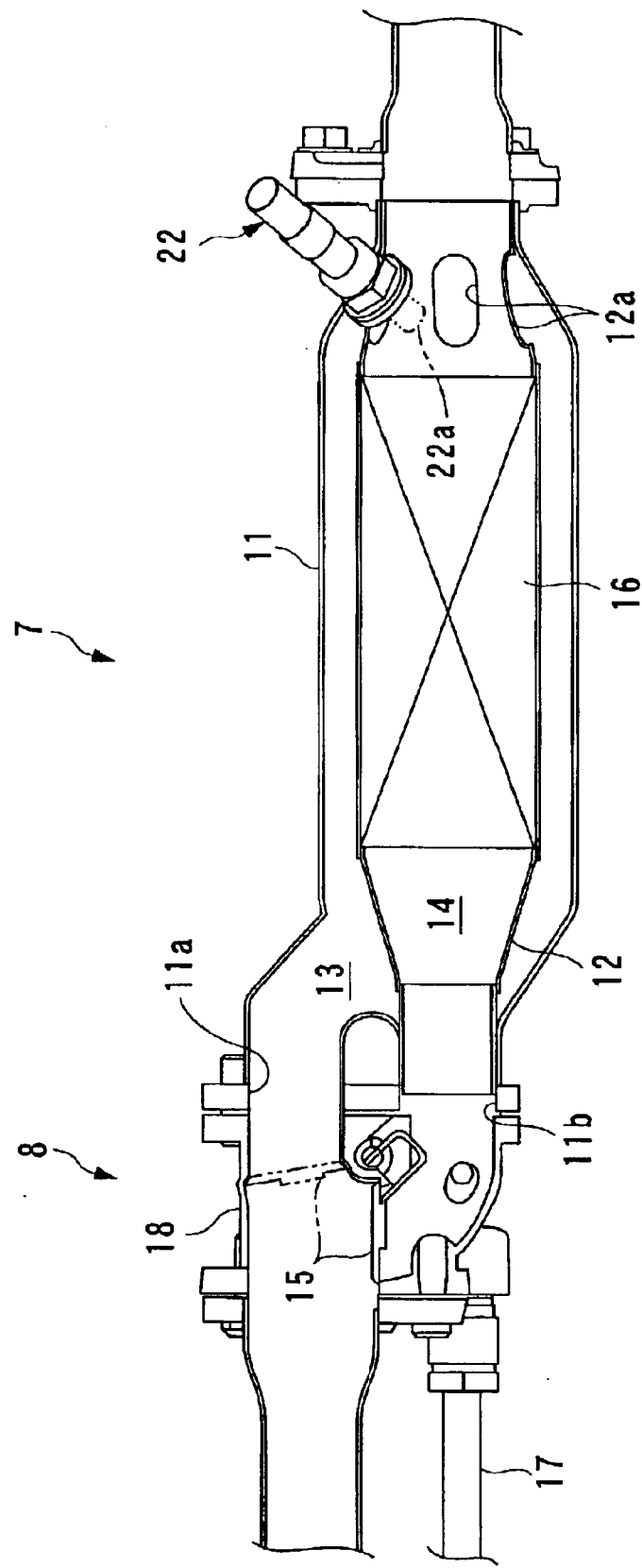
FIG. 2 is an enlarged cross-sectional view illustrating a hydrocarbon adsorbing device.

The hydrocarbon adsorber 7 in turn is arranged at a location downstream of the catalyzer 6 in the exhaust pipe 4, and provided for reducing the amount of hydrocarbons emitted to the atmosphere by adsorbing hydrocarbons within exhaust gases during a starting period (for example, for approximately 30 to 40 seconds from the start) of the engine 1 in a cold state in which the three-way catalysts 5 have not been activated. As illustrated in FIGS. 1 and 2, the hydrocarbon adsorber 7 is coupled to a downstream end of the catalyzer 6 through an exhaust passage switch 8. The hydrocarbon adsorber 7 comprises a cylindrical case 11; a bypass exhaust pipe 12 arranged within the case 11; and a cylindrical adsorbent 16 arranged halfway in the bypass exhaust pipe 12 for adsorbing hydrocarbons in exhaust gases which are introduced into the bypass exhaust pipe 12.

As illustrated in FIG. 2, a main passage 13 (first passage) is defined by an annular space in cross section between the case 11 and bypass exhaust pipe 12, while a bypass passage 14 (second passage) is defined by an internal space of the bypass exhaust pipe 12. The case 11 has its upstream end divided into two, i.e., an upper and a lower opening 11a, 11b. The upper opening 11a is in communication with the main passage 13, while the lower opening 11b is in communication with the bypass passage 14.

The bypass exhaust pipe 12 has its upstream end connected to an inner surface of the lower opening 11b of the case 11, and a downstream end connected to an inner surface of a downstream end of the case 11, respectively, in an air tight state. The bypass exhaust pipe 12 is formed with a plurality (for example, five) of elongated communication holes 12a in a downstream end portion in the circumferential direction at equal intervals, such that the downstream end of the main passage 13 is in communication with the downstream end of the bypass passage 14 through these communication holes 12a.

The adsorbent 16 is comprised of a honeycomb core (not shown), made of a metal, which carries zeolite on its surface, and has the property of adsorbing moisture as well as hydrocarbons. As exhaust gases introduced into the bypass passage 14 pass through the adsorbent 16, hydrocarbons and moisture in the exhaust gases are adsorbed by the zeolite. The zeolite, which has high heat resistant properties, adsorbs hydrocarbons at low temperatures (for example, below 100° C.), and desorbs hydrocarbons once adsorbed thereby at a predetermined temperature or higher (for example, 100–250° C.).

The exhaust passage switch 8 is provided for selectively switching the passage of exhaust gasses downstream of the catalyzer 6 to the main passage 13 or to bypass passage 14 in accordance with an activated state of the three-way catalysts 5. The exhaust passage switch 8 comprises a cylindrical coupling pipe 18; and a pivotable switching valve 15 arranged in the coupling pipe 18. The switching valve 15 is driven by a switching valve driver 19 (see FIG. 1) which is controlled by an ECU 25, later described, for switching the exhaust gas passage to the main passage 13 when it is present at a position indicated by solid lines in FIG. 2 (open position) and for switching the exhaust gas passage to the bypass passage 14 when it is present at a position indicated by two-dot chain lines (close position).

The EGR pipe 17 is also coupled between the coupling pipe 18 and the intake pipe 1a of the engine 1 for recirculating a portion of exhaust gases to the engine 1, and an EGR control valve 20 is arranged halfway in the EGR pipe 17. The EGR control valve 20 is controlled by the ECU 25 to actuate and stop the EGR and control an EGR amount.

In the foregoing configuration, the exhaust gas passage is switched to the bypass passage 14 by the exhaust passage switch 8 immediately after a cold start of the engine 1, thereby leading exhaust gasses passing through the catalyzer 6 to the bypass passage 14. The exhaust gases are emitted to the atmosphere after hydrocarbons in the exhaust gases have been adsorbed by the adsorbent 16. Subsequently, as hydrocarbons have been adsorbed by adsorbent 16, the exhaust gas passage is switched to the main passage 13 by the switching valve 15 to lead the exhaust gases to the main passage 13 through the coupling pipe 18 for emission to the atmosphere. Also, as the EGR control valve 20 is opened to operate the EGR, a portion of the exhaust gases is recirculated to the intake pipe 1a through the bypass passage 14 and EGR pipe 17 as an EGR gas. Hydrocarbons desorbed from the adsorbent 16 are sent to the intake pipe 1a by the EGR gas and burnt by the engine 1.

A humidity sensor 22 is attached to the case 11 of the hydrocarbon adsorber 7 at a location downstream of the adsorbent 16. The humidity sensor 22, which is integrated with a temperature sensor, includes a sensor element 22a which faces the bypass passage 14 for detecting a humidity VRST and a temperature THCM within the bypass passage 14 at the location at which it is mounted, and outputting detection signals to the ECU 25.

An engine water temperature sensor 23 and a crank angle sensor 24 are also attached to the body of the engine 1. The engine water temperature sensor 23 detects an engine water temperature TW, which is the temperature of cooling water circulating within a cylinder block of the engine 1 (hereinafter called the "engine water temperature"), and sends a detection signal indicative of the engine water temperature TW to the ECU 25. The crank angle sensor 24, on the other hand, outputs a CRK signal and a TDC signal, which are pulse signals, to the ECU 25 every predetermined crank angle as a crack shaft, not shown, of the engine 1 is rotated. An intake pressure sensor 26 is attached to the intake pipe 1a for detecting an absolute pressure PB within the intake pipe 1a and sending a detection signal indicative of the absolute pressure PB to the ECU 25. An external air temperature sensor. 27 (ambient temperature detecting means) is also provided for detecting an external air temperature TA and outputting a detection signal indicative of the external air temperature TA to the ECU 25. An alarm lamp 28 is further connected to the ECU 25 for generating an alarm by lighting when it is determined that the absorbent 16 is deteriorated.

In this embodiment, the ECU 25 functions as a starting temperature state detecting means, a post-starting exhaust gas calory calculating means, a switching valve driving means, and a stop temperature detecting means. The ECU 25 is based on a microcomputer which comprises an I/O interface, a CPU, a RAM including a backup RAM, a ROM and the like (neither not shown). The ECU 25 further comprises a post-stop timer 25a for measuring a time after the engine 1 is stopped, and the like. The detection signals from a variety of the aforementioned sensors are inputted to the CPU after they are A/D converted and reshaped in the I/O interface.

The CPU determines an operating condition of the engine 1 based on the engine parameter signals detected by a variety of sensors, calculates a fuel injection time Tout in accordance with the result of the determination in synchronism with the generation of the TDC signal, and outputs a driving signal based on the result of the calculation to an injector 1b. The CPU also executes various routines such as one for controlling the switching valve driver 19 to open and close the switching valve 15.

Figure 3:
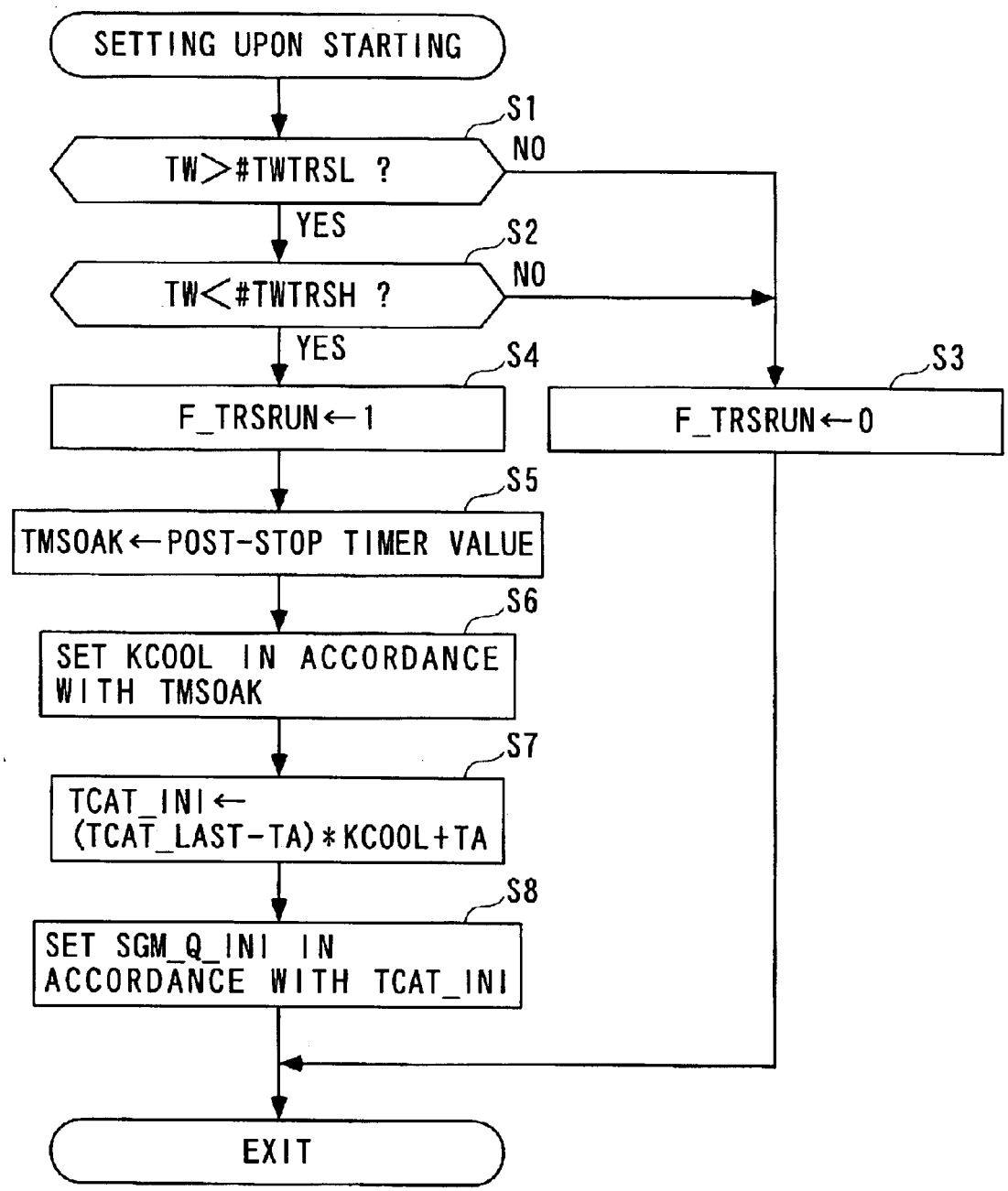
FIG. 3 is a flow chart illustrating a routine for making settings upon start of the engine.
Figure 4:
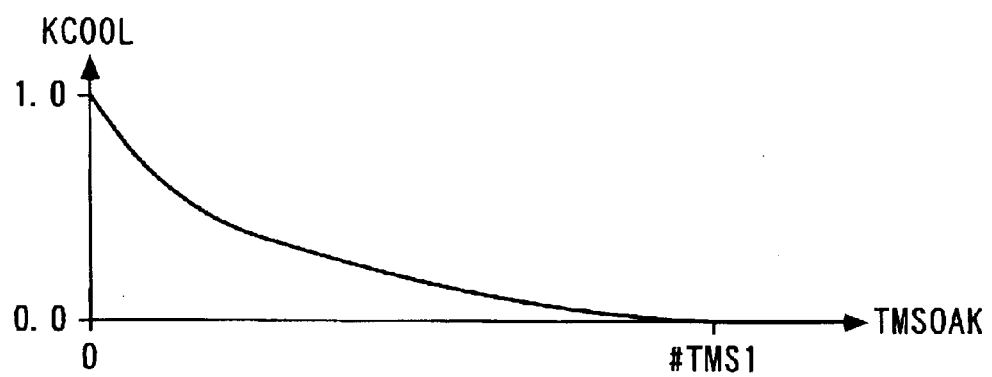
FIG. 4 shows a cooling coefficient table for setting a cooling coefficient KCOOL in accordance with a soak time TMSOAK.

Next, the routine for controlling opening/closing of the switching valve 15 will be described with reference to FIGS. 3 to 9. FIG. 3 illustrates a starting process which is executed only once when the engine 1 is started.

In the starting process, the CPU determines at step 1 (labeled as "S1" in the figure. The same designation is applied to the following description) and step 2 whether or not the engine water temperature TW is higher than a predetermined lower limit value #TWTRSL (for example, −20° C.) and is lower than a predetermined upper limit value #TWTRSH (for example, 50° C.), respectively. If any of the answers to steps 2, 3 is NO, indicating that TW≦#TWTRSL or TW≧#TWTRSH, the CPU set an execution enable flag F_TRSRUN to "0" on the assumption that the engine 1 falls out of a temperature range suitable for controlling the adsorption of hydrocarbons by the adsorbent 16 so that the adsorption control execution condition is not met, followed by termination of the starting process. Consequently, the execution of the adsorption control is disabled.

On the other hand, if the answers at both steps 1, 2 are YES, indicating that#TWTRSL<TW<#TWTRSH, the CPU sets the execution enable flag F_TRSRUN to "1" on the assumption that the adsorption control execution condition is met (step 4).

Next, the CPU sets the value of a post-stop timer 25a at that time as an inoperative time (hereinafter called the "soak time") TMSOAK from the previous stop to the current start of the engine 1 (step 5). Next, the CPU sets a cooling coefficient KCOOL by searching a cooling coefficient table shown in FIG. 4 in accordance with the soak time TMSOAK (step 6). The cooling coefficient KCOOL represents a theoretical value for an aging change in the ratio of a change value in temperature difference to its initial value. The cooling coefficient table lists such values in the form of a table. Therefore, the cooling coefficient KCOOL is set to 1.0 when the soak time TMSOAK is zero, set to 0 when the soak time TMSOAK is equal to or longer than a predetermined time #TMS1 (complete soak), and set to gradually decrease from 1.0 to 0 when the soak time TMSOAK does not reach the predetermined time #TMS1 (intermediate soak).

Next, the CPU uses the cooling coefficient KCOOL set at step 6 to calculate the temperature of the three-way catalysts 5 in the catalyzer 6 upon start of the engine 1 (hereinafter called the "start-time catalyst temperature") TCAT_INI (step 7) in accordance with the following equation (1):

$$TCAT\_INI = (TCAT\_LAST - TA) * KCOOL + TA \qquad (1)$$

where TA is the external air temperature detected by the external air temperature sensor 27, and TCAT_LAST is the temperature of the three-way catalysts 5 when the engine 1 was stopped the last time (hereinafter called the "stop-time catalyst temperature"). The stop-time catalyst temperature TCAT_LAST is estimated in a manner described below during the previous operation of the engine 1, and is stored in the backup RAM of the ECU 25 upon stop of the engine 1.

Figure 5:
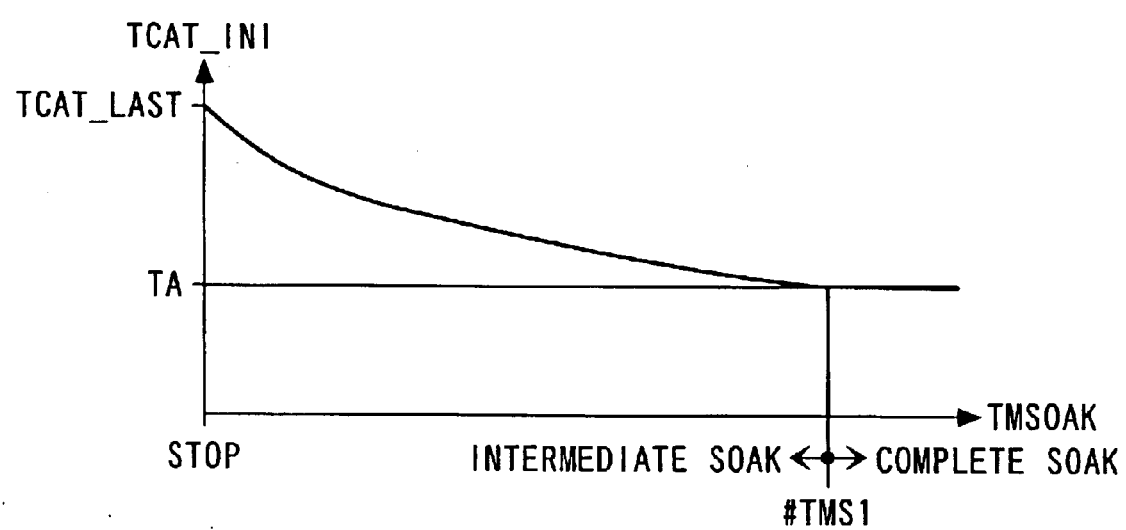
FIG. 5 is a graph showing an exemplary change in a start catalyst temperature TCAT_INI in accordance with a stop catalyst temperature TCAT_LAST, the soak time TMSOAK, and an external air temperature TA.

FIG. 5 shows an exemplary change in the start-time catalyst temperature TCAT_INI calculated in the foregoing manner. Specifically, assuming that the temperature TCAT of the three-way catalysts 5 (hereinafter called the "catalyst temperature") rises associated with the operation of the engine 1 and reaches the stop-time catalyst temperature TCAT_LAST upon stop of the engine 1, the catalyst temperature TCAT gradually decreases from the stop-time catalyst temperature TCAT_LAST to the external air temperature TA which is the ambient temperature therearound, and finally converges to the external temperature TA. In this event, the catalyst temperature TCAT follows a change in the cooling coefficient KCOOL in accordance with the soak time TMSOAK at a changing rate proportional to the temperature difference between the stop-time catalyst temperature TCAT_LAST and external air temperature TA. Therefore, with the aforementioned equation (1), the start-time catalyst temperature TCAT_IN can be appropriately calculated in accordance with the stop-time catalyst temperature TCAT_LAST, external temperature TA and soak time TMSOAK not only for complete soak but also for intermediate soak.

Figure 6:
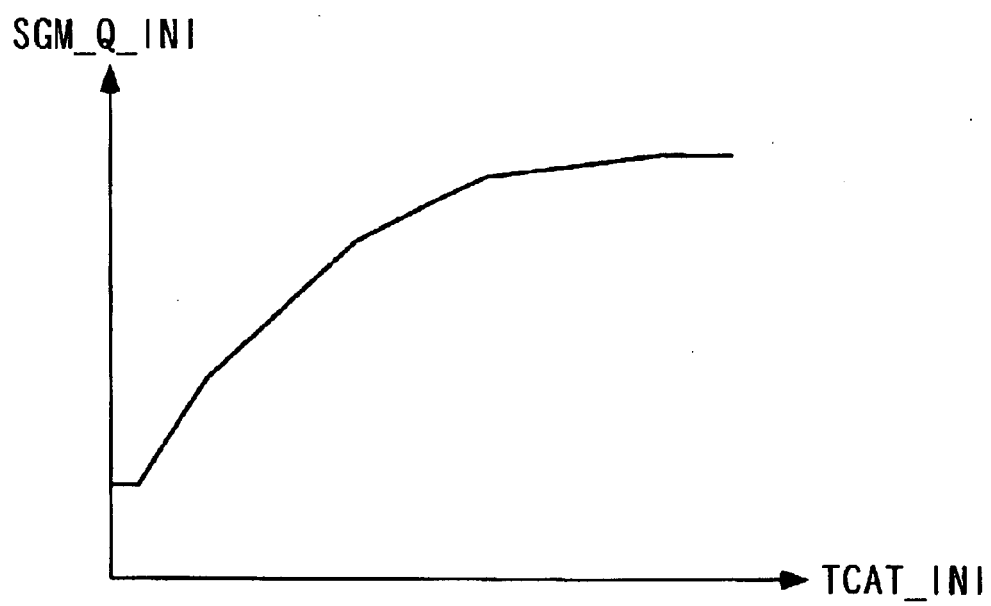
FIG. 6 is an exhaust gas calory initial value table for setting an initial value SGM_Q_INI for an accumulated exhaust gas calory value SGM_Q in accordance with the start catalyst temperature TCAT_INI.
Figure 7:
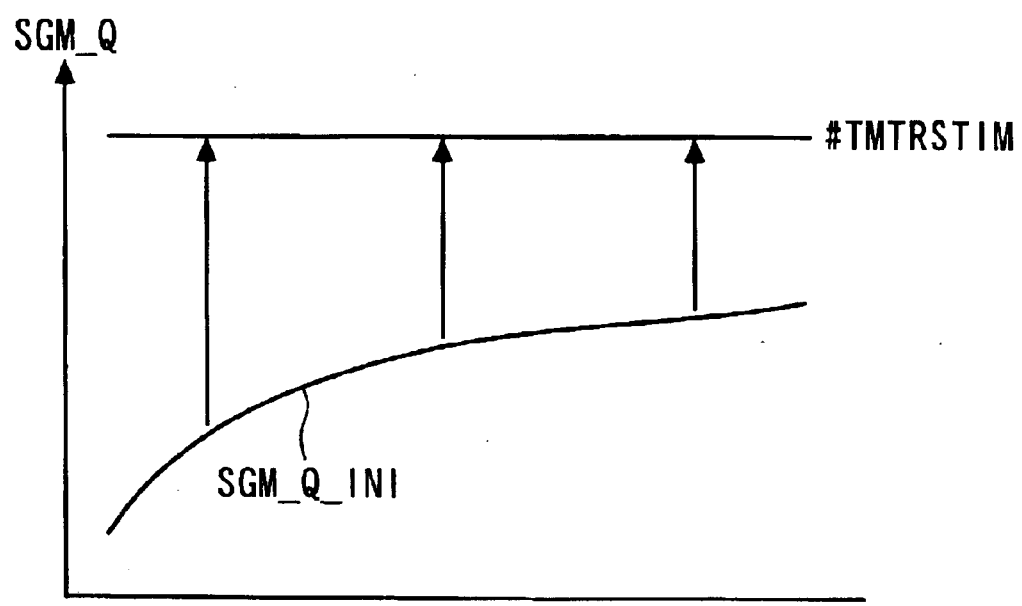
FIG. 7 is a graph showing the relationship among the accumulated exhaust gas calory value SGM_Q, its initial value SGM_Q_INI, and a determination value #TMTRSTIM.

Turning back to FIG. 3, at step 8 subsequent to step 7, the CPU sets an initial value SGM_Q_INI for the accumulated exhaust gas calory value SGM_Q by searching an exhaust gas calory initial value table shown in FIG. 6 in accordance with the start-time catalyst temperature TCAT_INI calculated as described above, followed by termination of the starting process. In the exhaust gas calory initial value table, the initial value SGM_Q_INI is set at a smaller value as the start-time catalyst temperature TCAT_INI is lower. As described below, the accumulated exhaust gas calory value SGM_Q (post-start exhaust gas calory) is used as a parameter indicative of an activated state of the three-way catalyst 5. The three-way catalyst 5 is determined to be activated when the accumulated exhaust gas calory value SGM_Q exceeds a redetermined determination value #TMTRSTIM corresponding to the temperature at which the three-way catalyst 5 is activated. Also, as shown in FIG. 7, the calory of exhaust gases required to bring the catalyst temperature TCAT to the activation temperature varies depending on the start-time catalyst temperature TCAT_INI, and is larger as the TCAT_INI value is lower. It is therefore possible to appropriately determine the activation of the three-way catalyst 5 by setting the initial value SGM_Q_IN for the accumulated exhaust gas calory value SGM_Q in accordance with the start-time catalyst temperature TCAT_INI in the foregoing manner.

Figure 8:
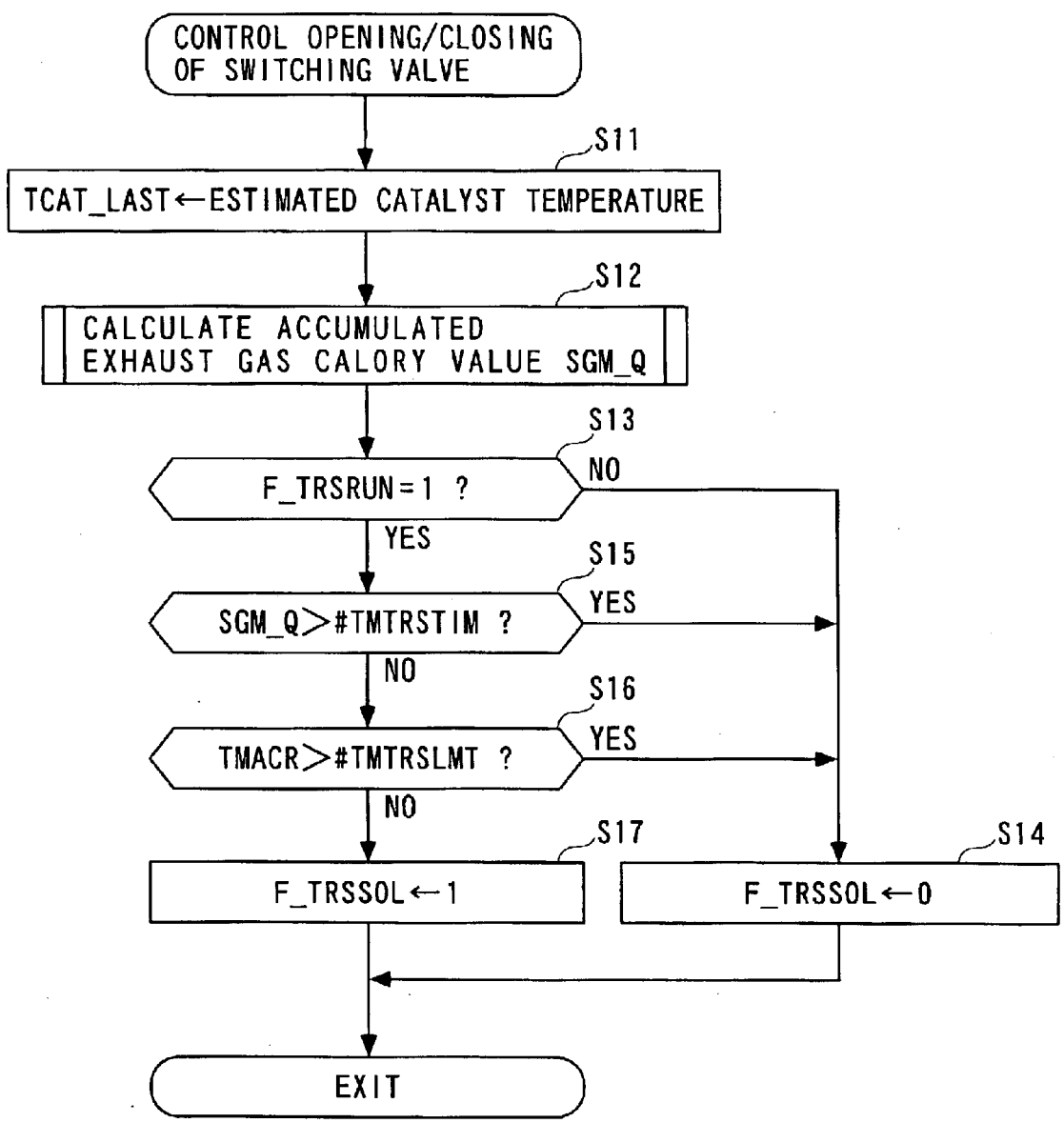
FIG. 8 is a flow chart illustrating a routine for controlling the switching valve to open and close.

FIG. 8 illustrates a routine for controlling opening/closing of the switching valve 15. This routine is executed every predetermined time (for example, every 100 ms) after the start of the engine 1. In the switching valve control routine, the CPU first estimates the catalyst temperature TCAT and sets this value as the stop-time catalyst temperature TCAT_LAST at step 11. The stop-time catalyst temperature TCAT_LAST thus set and updated every predetermined time is stored in the backup RAM of the ECU 25, and is applied to the aforementioned equation (1) at step 7 in FIG. 3 the next time the engine 1 is started. The estimate of the catalyst temperature TCAT is derived by thermodynamically modelling the exhaust system 2, determining the temperature at an exhaust outlet port of the engine 1, i.e., the upstream end temperature of the exhaust system 2, based on an absolute intake pipe internal temperature PB and engine rotational speed NE, and sequentially calculating the downstream temperature of the modeled exhaust system 2 based on the upstream end temperature. By thus calculating the catalyst temperature TCAT, the temperature sensor for detecting the catalyst temperature TCAT can be removed.

Figure 9:
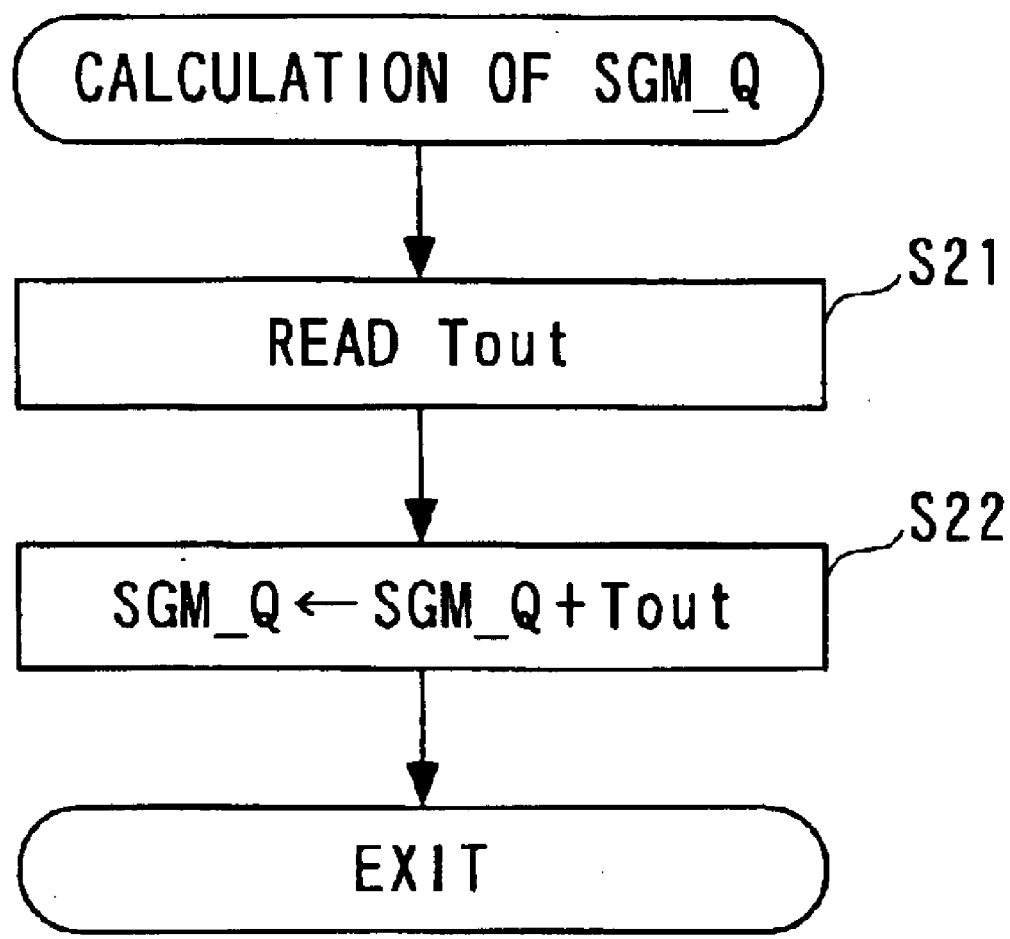
FIG. 9 is a flow chart illustrating a routine for calculating the accumulated exhaust gas calory value SGM_Q.

Next, the routine proceeds to step 12, where the CPU calculates the accumulated exhaust gas calory value SGM_Q. This accumulated exhaust gas calory value SGM_Q represents the accumulated calory of exhaust gases which are exhausted after the engine 1 is started. FIG. 9 illustrates a subroutine for calculating the accumulated exhaust gas calory value SGM_Q.

In the SGM_Q calculating subroutine, the CPU first reads a fuel injection time Tout of the injector 1b for each cylinder (step 21). Then, the CPU adds the read fuel injection time Tout to the preceding version of the accumulated exhaust gas calory value SGM_Q, and sets the resulting sum as the current accumulated exhaust gas calory value SGM_Q (step 22). In this event, immediately after the engine 1 is started, the initial value SGM_Q_INI calculated at step 8 in FIG. 3 is used for the preceding version of the accumulated exhaust gas calory value SGM_Q.

Turning back to FIG. 8, at step 13 subsequent to step 12, the CPU determines whether or not the execution enable flag F_TRSRUN is "1." If the answer to step 13 is NO, indicating that the adsorption control execution condition is not met, the CPU sets a switching valve flag F_TRSSOL to "0" (step 14), followed by termination of the the switching valve control routine. By setting the switching valve flag F_TRSSOL to "0," the switching valve driver 19 drives the switching valve 15 to the open position to open the main passage 13 and close the bypass passage 14. In this way, exhaust gases are introduced only into the main passage 13, thereby disabling the adsorbent 16 to adsorb hydrocarbons.

If the answer at step 13 is YES, indicating that the adsorption control execution condition is met, the CPU determines whether or not the accumulated exhaust gas calory value SGM_Q calculated at step 12 is larger than a predetermined determination value #TMTRSTIM (step 15). If the answer to step 15 is NO, indicating that the accumulated exhaust gas calory value SGM_Q has not reached the determination value #TMTRSTIM, the switching valve control routine proceeds to step 16 on the assumption that sufficient calory of exhaust gases has not been provided to the three-way catalyst 5 so that the three-way catalyst 5 has not been activated. At step 16, the CPU determines whether or not a post-start time TMACR measured by a post-start timer (not shown) is larger than a predetermined limit time #TMTRSLMT (for example, 90 seconds). Then, if the answer to step 16 is NO, the CPU sets the switching valve flag F_TRSSOL to "1" (step 17), followed by termination of the switching valve control routine. By setting F_TRSSOL to "1," the switching valve 15 is switched to the close position to close the main passage 13 and open the bypass passage 14. In this way, exhaust gases are passed to the adsorbent 16 which adsorbs hydrocarbons within the exhaust gases.

On the other hand, if the answer to step 15 is YES, indicating that the accumulated exhaust gas calory value SGM_Q exceeds the determination value #TMTRSTIM, the CPU executes step 14 on the assumption that the three-way catalyst 5 has been activated by sufficient calory of exhaust gases supplied to the three-way catalyst 5. This concludes the operation of the adsorbent 16 for adsorbing hydrocarbons.

If the answer to step 16 is YES, i.e., when the limit time #TMTRSLTM elapses before the accumulated exhaust gas calory value SGM_Q reaches the determination value

TMTRSTIM after the start of the engine 1, the CPU executes step 14 on the assumption that the adsorbent 16 should terminate the adsorption of hydrocarbons, followed by termination of the switching valve control routine.

As described above in detail, according to the foregoing embodiment, the CPU calculates the start-time catalyst temperature TCAT_INI indicative of a temperature state of the three-way catalyst 5 upon start of the engine 1, calculates the initial value SGM_Q_INI for the accumulated exhaust gas calory value SGM_Q in accordance with the calculated start-time catalyst temperature TCAT_INI, and adds the calory (Tout) of exhaust gases applied to the three-way catalyst 5 after the start of the engine 1 to the initial value SGM_Q_INI to calculate the accumulated exhaust gas calory value SGM_Q. Consequently, the accumulated exhaust gas calory value SGM_Q exactly reflects the temperature state, i.e., activated state of the three-way catalyst 5.

Then, the CPU determines that the three-way catalyst 5 is activated when the accumulated exhaust gas calory value SGM_Q exceeds the predetermined determination value #TMTRSTIM indicative of the temperature at which the three-way catalyst 5 is activated, and switches the switching valve 15 from the bypass passage 14 to the main passage 13. In the foregoing manner, the activated state of the three-way catalyst 5 is evaluated by the start-time catalyst temperature TCAT_INI only upon starting, and is evaluated by the accumulated exhaust calory value SGM_Q_INI, based on the start-time catalyst temperature TCAT_INI, after the starting, thereby making it possible to accurately determine the activated state of the three-way catalyst while avoiding inaccuracy which would result from a determination that is made using a detection result of the temperature sensor after the start of the engine 1. Consequently, the switching valve 15 can be switched to the main passage 13 in accordance with an actual activated state of the three-way catalyst 5 at an optimal timing immediately after it is activated, thereby achieving an optimal exhaust gas characteristic.

Also, since the start-time catalyst temperature TCAT_INI is calculated in accordance with the stop-time catalyst temperature TCAT_LAT detected at the last time the engine was stopped, soak time TMSOAK, and external air temperature TA which is the ambient temperature, the start-time catalyst temperature TCAT_INI can be found with high accuracy in accordance with the previous operating condition of the engine 1, and the soak time SOAK. It is therefore possible to further improve the accuracy of determining the activated state of the three-way catalyst 5, based on the start-time catalyst temperature TCAT_INI, and to further appropriately set the switching timing for the switching valve 15.

In the foregoing embodiment, the start-time catalyst temperature TCAT_INI calculated from the stop-time catalyst temperature TCAT_LAST and the like is used as a parameter representative of the temperature state of the three-way catalyst 5 upon start of the engine 1. Instead, a detection result provided by the temperature sensor may be used as such a parameter. For example, the start-time catalyst temperature TCAT_INI may be replaced with a detected temperature value THCM provided by the humidity sensor 22 integrated with a temperature sensor, which is disposed downstream of the adsorbent 16. Alternatively, as indicated by broken line in FIG. 1, a catalyst temperature sensor 29 may be attached to the three-way catalyst 5 to use a detected temperature value TCAT from the catalyst temperature sensor 29. Again, in this strategy, the detected temperature value THCM or TCAT detected upon starting is used only as a parameter indicative of the temperature state of the three-way catalyst 5 upon starting, in a manner similar to the start-time catalyst temperature TCAT_INI, thereby providing similar advantages to those of the aforementioned embodiment.

Figure 10:
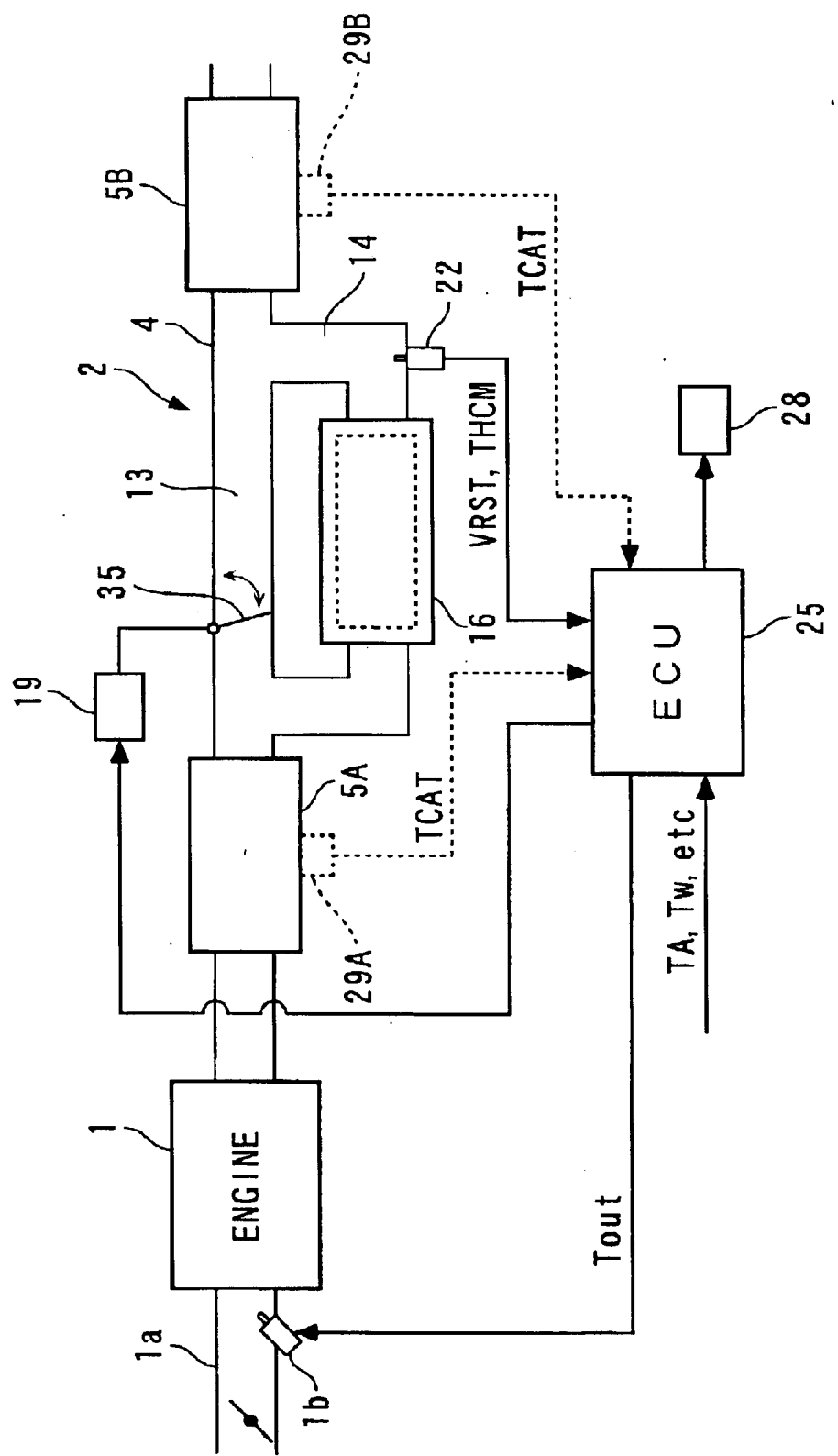
FIG. 10 is block diagram illustrating the configuration of an exhaust gas purifying apparatus for an internal combustion engine according to a second embodiment of the present invention.

FIG. 10 illustrates in block diagram form an exhaust gas purifying apparatus according to a second embodiment of the present invention. The illustrated exhaust gas purifying apparatus differs from the first embodiment only in the positions of the three-way catalysts and switching valve. Components identical to those in the first embodiment or components having equivalent functions to those in the first embodiment are designated the same reference numerals, and detailed description thereon is omitted. As illustrated in FIG. 10, the exhaust gas purifying apparatus comprises a pair of upstream and downstream three-way catalysts 5A, 5B, each of which contains a three-way catalyst (not shown), within the exhaust pipe 4 of the exhaust system 2 in the engine 1. A passage between the three-way catalysts 5A, 5B in the exhaust pipe 4 is branched into a main passage 13 and a bypass passage 14 which circumvents the main passage 13. An absorbent 16 is filled in the bypass passage 14. A switching valve 35 is disposed in the main passage 13, and is controlled by the ECU 25 to open and close through the switching valve driver 19. The rest of configuration is similar to the first embodiment, including the routine executed by the ECU 25 to control opening/closing of the switching valve 35.

With the foregoing configuration, in the second embodiment, the switching valve 35 is switched to a close position to fully close the main passage 13 when the adsorption control execution condition is met upon start of the engine 1. In this state, exhaust gases passing through the upstream three-way catalyst 5A are entirely passed to the bypass passage 14, and flow into the downstream three-way catalyst 5B after hydrocarbons within the exhaust gases are adsorbed by the adsorbent 16, thereby preventing hydrocarbons from being emitted to the atmosphere. Subsequently, the CPU determines that the upstream three-way catalyst 5A is activated when an accumulated exhaust gas calory value SGM_Q calculated in a manner similar to the first embodiment exceeds a predetermined determination value indicative of the temperature at which the upstream three-way catalyst 5A, and the switching valve 35 is switched to the open position to fully open the main passage 13. In this state, exhaust gases are purified by the activated upstream three-way catalyst 5A through its oxidation/reduction catalyst actions.

Further, the CPU determines that the downstream three-way catalyst 5B is activated when an accumulated exhaust gas calory value SGM_Q calculated in a manner similar to the first embodiment exceeds a predetermined determination value indicative of a temperature at which the downstream three-way catalyst 5B is activated, and the switching valve 35 may be switched to the open position to fully open the main passage 13. In this sate, a majority of exhaust gases, after passing through the main passage 13, flows into the activated downstream three-way catalyst 5B and is purified thereby through its oxidation/reduction catalyst action. Further, in this state, the switching valve 35 is operated to apply a portion of exhaust gases into the bypass passage 14 to slowly heat the adsorbent 16 with the heat of the applied exhaust gases, thereby promoting the desorption of hydrocarbons. In the foregoing manner, the second embodiment is similar to the first embodiment in that the switching valve 35 can be switched to the main passage 13 at an optimal timing immediately after the upstream or downstream three-way catalyst 5A, 5B is activated, in accordance with an actual activated state of the upstream or downstream three-way catalyst 5A, 5B, thereby achieving an optimal exhaust gas characteristic.

Also, in the second embodiment, the detected temperature value THCM from the humidity sensor 22 integrated with a temperature sensor, located downstream of the adsorbent 16 may be used as a parameter indicative of the temperature state of the upstream or downstream three-way catalyst 5A, 5B upon starting, instead of the estimated start-time catalyst temperature TCAT_INI found through a calculation. Alternatively, catalyst temperature sensors 29A, 29B may be mounted to at least one of the upstream and downstream three-way catalysts 5A, 5B, as indicated by broken lines in FIG. 10, to use a detected temperature value TCAT thereof.

Further, in the foregoing embodiment, the external air temperature TA is used as a parameter indicative of the ambient temperature around the engine 1, however, the external air temperature TA may be replaced with an intake air temperature detected by an intake air temperature sensor disposed on the intake pipe 1a. Otherwise, details in the configuration may be modified as appropriate without departing from the spirit and scope of the present invention.

As described above in detail, the exhaust gas purifying apparatus for an internal combustion engine according to the present invention can switch the switching valve at an optimal timing in accordance with an actual activated state of the catalyzer, thereby achieving an optimal exhaust gas characteristic.

What is claimed is:

1. An exhaust gas purifying apparatus for an internal combustion engine for purifying exhaust gases discharged from said internal combustion engine, and temporarily adsorbing hydrocarbons within exhaust gases upon start of said internal combustion engine, said exhaust gas purifying apparatus comprising:

a catalyzer disposed in an exhaust system of said internal combustion engine for purifying exhaust gases;

an adsorbent filled in a second passage in said exhaust system for adsorbing hydrocarbons within exhaust gases, said second passage circumventing a first passage;

a switching valve operable to switch between an open position for opening said first passage and a close position for closing said first passage;

start-time temperature state detecting means for detecting a temperature state of said exhaust system upon start of said internal combustion engine;

post-start exhaust gas calory calculating means for calculating the calory of exhaust gases discharged after the start of said internal combustion engine; and switching valve driving means for driving said switching valve to said close position upon start of said internal combustion engine, and for driving said switching valve to said open position in accordance with the detected start-time temperature state of said exhaust system, and the calculated post-start exhaust gas calory.

2. An exhaust gas purifying apparatus according to claim 1, wherein said start-time temperature state detecting means includes:

stop-time temperature detecting means for detecting the temperature of said exhaust system at the preceding stop of said internal combustion engine; and inoperative time measuring means for measuring an inoperative time from the preceding stop to the current start of said internal combustion engine, wherein said start-time temperature state detecting means is configured to find the start-time temperature state of said exhaust system in accordance with the detected stop-time temperature of said exhaust system and the measured inoperative time.

3. An exhaust gas purifying apparatus according to claim 2, wherein said start-time temperature state detecting means further includes:

an ambient temperature detecting means for detecting the ambient temperature around said internal combustion engine, wherein said start-time temperature state detecting means is configured to find the start-time temperature state of said exhaust system in accordance further with the detected ambient temperature.

* * * * *